(12) United States Patent
Ranjan et al.

(10) Patent No.: US 11,175,844 B1
(45) Date of Patent: Nov. 16, 2021

(54) OPTIMAL PLACEMENT OF DATA STRUCTURES IN A HYBRID MEMORY BASED INFERENCE COMPUTING PLATFORM

(71) Applicant: INTERNATIONAL BUSINESS MACHINES CORPORATION, Armonk, NY (US)

(72) Inventors: Ashish Ranjan, White Plains, NY (US); Arvind Kumar, Chappaqua, NY (US); Carl Radens, LaGrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/929,618

(22) Filed: May 13, 2020

(51) Int. Cl.
  *G06F 13/00* (2006.01)
  *G06F 3/06* (2006.01)
  *G06N 3/04* (2006.01)

(52) U.S. Cl.
  CPC .......... *G06F 3/0644* (2013.01); *G06F 3/0604* (2013.01); *G06F 3/068* (2013.01); *G06N 3/04* (2013.01)

(58) Field of Classification Search
  CPC ....... G06F 3/0644; G06F 3/0604; G06N 3/04; G06N 3/068
  See application file for complete search history.

(56) References Cited

U.S. PATENT DOCUMENTS

| 9,195,934 B1 | 11/2015 | Hunt et al. |
| 9,959,500 B1 | 5/2018 | Torng et al. |
| 2016/0086078 A1* | 3/2016 | Ji .......................... G06N 3/0454 382/157 |
| 2018/0018560 A1* | 1/2018 | Saldana ................ G06F 3/0625 |
| 2018/0082181 A1* | 3/2018 | Brothers .............. G06N 3/0454 |
| 2019/0164037 A1 | 5/2019 | Kim et al. |

(Continued)

FOREIGN PATENT DOCUMENTS

| CN | 103678143 A | 3/2014 |
| TW | 201915836 A | 4/2019 |
| WO | 2019157599 A1 | 8/2019 |

OTHER PUBLICATIONS

Roy et al. "NUMA-Caffe: NUMA-aware deep learning neural networks." ACM Transactions on Architecture and Code Optimization (TACO) 15.2 (2018): 24.

(Continued)

*Primary Examiner* — Jing-Yih Shyu
(74) *Attorney, Agent, or Firm* — Griffiths & Seaton PLLC (57) ABSTRACT

In a deep neural network (DNN), weights are defined that represent a strength of connections between different neurons of the DNN and activations are defined that represent an output produced by a neuron after passing through an activation function of receiving an input and producing an output based on some threshold value. The weight traffic associated with a hybrid memory therefore is distinguished from the activation traffic to the hybrid memory, and one or more data structures may be dynamically allocated in the hybrid memory according to the weights and activations of the one or more data structures in the DNN. The hybrid memory includes at least a first memory and a second memory that differ according to write endurance attributes.

17 Claims, 8 Drawing Sheets

(56) References Cited

U.S. PATENT DOCUMENTS

| | | | |
|---|---|---|---|
| 2019/0228495 A1 | 7/2019 | Tremplay et al. | |
| 2019/0244106 A1* | 8/2019 | Franca-Neto | G06N 3/0481 |
| 2019/0286972 A1* | 9/2019 | El Husseini | G06N 3/063 |
| 2019/0303743 A1* | 10/2019 | Venkataramani | G06F 9/3834 |
| 2019/0378001 A1* | 12/2019 | Litvak | G06N 3/0472 |
| 2020/0210840 A1* | 7/2020 | Darvish Rouhani | G06F 9/30025 |
| 2020/0226453 A1* | 7/2020 | Luk | G06N 3/0454 |
| 2020/0285950 A1* | 9/2020 | Baum | G06F 8/41 |
| 2020/0380306 A1* | 12/2020 | Hada | G06N 3/0481 |
| 2021/0019633 A1* | 1/2021 | Venkatesh | G06N 3/0454 |

OTHER PUBLICATIONS

Huili and Chen et al. "DeepAttest: An End-to-End Attestation Framework for Deep Neural Networks" ISCA 19, Jun. 22-26, 2019 Phoenix, AZ. (12 Pages).

Khan et al. "SpiNNaker: mapping neural networks onto a massively-parallel chip multiprocessor." 2008 IEEE International Joint Conference on Neural Networks (IEEE World Congress on Computational Intelligence). Ieee, 2008.

Chen et al. "Diannao: A small-footprint high-throughput accelerator for ubiquitous machine-learning." ACM Sigplan Notices. vol. 49. No. 4. ACM, 2014.

Ovcharov et al. "Accelerating deep convolutional neural networks using specialized hardware." Microsoft Research Whitepaper 2.11 (2015): 1-4.

Chen et al., "Eyeriss: A spatial architecture for energy-efficient dataflow for convolutional neural networks." ACM SIGARCH Computer Architecture News. vol. 44. No. 3. IEEE Press, 2016.

Yoon et al. "Transfer and Online Reinforcement Learning in STT-MRAM Based Embedded Systems for Autonomous Drones." 2019 Design, Automation & Test in Europe Conference & Exhibition (DATE). IEEE, 2019.

* cited by examiner

OPTIMAL PLACEMENT OF DATA STRUCTURES IN A HYBRID MEMORY BASED INFERENCE COMPUTING PLATFORM

BACKGROUND OF THE INVENTION

Field of the Invention

The present invention relates in general to computing systems, and more particularly to, various embodiments for optimal placement of data structures in a hybrid memory based inference engine/computing platform in a computing environment by a processor.

Description of the Related Art

In today's society, consumers, business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computing systems.

SUMMARY OF THE INVENTION

Various embodiments for optimal placement of data structures in a hybrid memory based inference engine/computing platform using one or more processors in a computing environment are provided. In one embodiment, by way of example only, a method for providing optimal placement of data structures in memory in a computing environment, again by a processor, is provided. One or more data structures may be dynamically allocated in a hybrid memory according to weights and activations of the one or more data structures in a deep neural network ("DNN"). The hybrid memory includes at least a first memory and a second memory that differ according to write attributes. The first memory may be a non-volatile memory ("NVM") based memory and the second memory may be a CMOS-based memory.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present invention relates generally to the field of artificial intelligence ("AI") such as, for example, machine learning and/or deep learning. "Machine learning" is used to broadly describe a primary function of electronic systems that learn from data. In machine learning and cognitive science, neural networks are a family of statistical learning models inspired by the biological neural networks of animals, and in particular the brain. Neural networks can be used to estimate or approximate systems and functions that depend on a large number of inputs and are generally unknown.

Neural networks use a class of algorithms based on a concept of inter-connected "neurons." In a typical neural network, neurons have a given activation function that operates on the inputs. By determining proper connection weights (a process also referred to as "training"), a neural network achieves efficient recognition of a desired patterns, such as, for example, images and characters. Oftentimes, these neurons are grouped into "layers" in order to make connections between groups more obvious and to each computation of values.

Deep-learning refers to a class of machine learning algorithms that are based on the learning of multiple levels of features or representations of a set of data. Current deep-learning methods include using a cascade of multiple layers of nonlinear processing units for feature extraction and transformation. Feature extraction refers to the process of receiving an initial set of measured data and building derived values (or features) to facilitate subsequent learning and generalization steps. In many cases, higher level features are derived from lower level features to generate a hierarchical representation of the measured data and the derived features.

Moreover, deep learning algorithms are based on distributed representations. Distributed representations operate under the assumption that observed (or measured) data are the result of interactions of one or more factors organized into one or more layers. Conceptually, deep learning introduces an additional assumption that the layers of factors that interact to provide the measured data are representative of levels of abstraction or composition. Under this assumption, multiple layers and layer sizes correspond to different amounts of abstraction.

Overall, deep learning has led to major advances in optimizing decision making and extracting business value from unstructured data such as, for example, images, audio, videos and texts. However, while deep learning achieves increased computing performance on a wide variety of data types and tasks, some challenges, data structure placement and memory allocations issues of Deep Neural Networks (DNNs) exists.

For example, a DNN places significant demand on the memory subsystems with growing model sizes and datasets. A growing fraction of processor chip area and energy in DNN accelerators is spent on memories, which face challenges with technology scaling. Consequently, emerging non-volatile memory (NVMs) technologies that can improve the efficiency of memory systems while overcoming the challenges of complementary metal-oxide semiconductor ("CMOS") memories, are of significant interest. NVMs offer several unique attributes such as, for example, near-zero leakage, and high density that are beneficial for memory design.

However, many different challenges exist with NVMs. Some of them include, for example, the NVM is 1) limited by the high energy requirements, 2) high latency incurred during write operations, 3) limited endurance, or 4) limited number of write cycles. Accordingly, a need exists for a novel solution that can exploit the strengths of NVMs while overcoming their weaknesses, thereby achieving energy-efficient memory systems in DNN accelerators.

Thus, to overcome this challenge, the present invention provides a novel solution by distinguishing the memory traffic pertaining to model data structures (e.g., weights and biases) of DNN from the memory traffic resulting from activation data structures for each DNN layer during inference. That is, the present invention may distinguish between weight memory traffic with activation memory traffic. Said differently, the present invention may distinguish between weight memory data structures with activation memory data structures.

In an additional aspect, the present invention may dynamically allocate one or more data structures in a hybrid memory according to weights and activations of one or more data structures in a deep neural network ("DNN"). The hybrid memory includes at least a first memory and a second memory that differ according to write attributes, characteristics, and/or properties such as, for example, differences in write energy, write latency, and/or write endurance. In one aspect, the non-volatile memory ("NVM") based memory may be the first memory and the CMOS-based memory may be the second memory. In one aspect, the present invention may store (e.g., reads) the model parameters to (from) a first memory (e.g., a first NVM based memory), and uses the second memory (e.g., a complementary metal-oxide semiconductor ("CMOS")-based memory) such as, for example, a static random access memory ("SRAM") to store the output activations. This memory partitioning achieves significant energy efficiency by exploiting the varying intensity of read/write operations in each DNN data structure.

Thus, the present invention may mitigate the performance (or energy) penalty due to disparity in read and write latency (or energy) and may also improve endurance (i.e., extend the lifetime of the memory). In one aspect, as used herein, "endurance" may be referred to by how many times a write operation may write to the memory. Therefore, the present invention may extend to NVMs (or any other memory) that may have a disparity in writes/read performance or may have a disparity in endurance.

In an additional aspect, the present invention provides for optimal placement of data structures in memory. One or more data structures may be dynamically allocated in one or more discrete and/or separate memories that may include 1) a non-volatile memory ("NVM") based memory and CMOS-based memory, 2) a hybrid memory that includes NVM and CMOS memory (e.g., a hybrid memory that includes the NVM and the CMOS memory, which are not distinct and separated), and/or 3) one or more memory types that differ in various attributes (e.g., write attributes) such as, for example, write energy, write latency, write endurance, or a combination thereof. In one aspect, the first memory (e.g., NVM) may include, but not limited to, memristor, magnetoresistive RAM ("MRAM"), resistive RAM ("RRAM"), conductive bridging RAM ("CBRAM"), or phase change memory ("PCM") elements. The second memory (e.g., CMOS memory) may include SRAM or other type of memory that have reduced the write energy, write latency, write endurance, or a combination thereof.

Said differently, the hybrid memory may be comprised of an NVM and a CMOS that are not distinct and separated (e.g., a single memory including both the NVM and the CMOS). Alternatively, the hybrid memory may be comprised of an NVM and a CMOS that are distinct and separated (e.g., multiple memories that include the NVM and the CMOS).

For example, in one aspect, one or more data structures may be dynamically allocated in one or more types of memory configurations/combinations (e.g., the discrete and/or separate memories that may include 1) a non-volatile memory ("NVM") based memory and CMOS-based memory or the hybrid memory comprised of the NVM and the CMOS) according to weights and activations of the or more data structures in a deep neural network ("DNN"). That is, the weights in a neural network represent the strength of the connections between the different neurons. Similarly, activations represent the output produced by a neuron after it goes through a process called an "activation function". An activation function may be a function that takes in some input and produces some output value based on some threshold. In one aspect, the hybrid memory may include both non-volatile memory ("NVM") based memory and CMOS-based memory. In another aspect, the hybrid memory may include different types of memories or memory combinations that each differ according to the write endurance attributes of the specific memory.

In another aspect, the present invention may leverage the varying read/write characteristics of DNN data structures such as, for example by distinguishing between activations from weights when reading from/writing to memory. It should be noted that weights and activations have different characteristics. The weights during DNN inference are read intensive, while activations are both read and write intensive. The number of writes to the one or more discrete and/or separate memories may be minimized to achieve and increase energy-efficiency. The present invention may also mitigate a performance penalty.

For example, consider a scenario where there is only non-volatile memory ("NVM")-based memory. In this case, both weights and activations may be written/read from the NVM-based memory. Writes in NVMs may incur significant latency (e.g., greater than five times ("5×") more than CMOS-based SRAM). Thus, using mechanisms of the illustrated embodiments, avoiding the writes to NVMs for the dynamic (read/write-intensive) activations and redirecting those writes to CMOS-based SRAM results in much lower write energy, write latency, write endurance, or a combination thereof minimizing the impact on overall system performance.

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

It should be noted that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

As used herein, by way of example only, "best," "appropriate," and/or "optimize" may be used herein interchangeable and refer to and/or defined as "maximize," "minimize," or attain one or more specific targets, objectives, goals, or intentions. "Best," "appropriate," and/or "optimize" may also refer to maximizing a benefit to a user (e.g., maximize a workflow pipeline). "Best," "appropriate," and/or "optimize" may also refer to making the most effective or functional use of a situation, opportunity, or resource.

Additionally, "best," "appropriate," and/or "optimize" may need not refer to a best solution or result but may refer to a solution or result that "is good enough" for a particular application, for example. In some implementations, an objective is to suggest a "best" combination of sections/items/defined objects, but there may be a variety of factors that may result in alternate suggestion of a combination of sections/items/defined objects/activities/applications yielding better results. Thus, some changes to the variety of factors may result in a jump from one minimum/maximum to another minimum/maximum. In either case, resulting suggestions of a combination of sections/items/defined objects/activities/applications of the optimal/best executor nodes may be determined by whatever "function" may be considered "good enough," "substantially optimal," and/or "sufficiently good." Herein, the terms "best," "appropriate," and/or "optimize" may also refer to such results based on minima (or maxima, depending on what parameters are considered in the optimization problem) for suggesting of a combination of optimal/best applications, programs, and/or computing components.

In an additional aspect, the terms "optimize" and/or "optimizing" may refer to an operation performed in order to achieve an improved result such as, for example, reduced execution costs or increased resource utilization, whether or not the optimum result is actually achieved. Similarly, the term "optimize" may refer to a component for performing such an improvement operation, and the term "optimized" may be used to describe the result of such an improvement operation.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
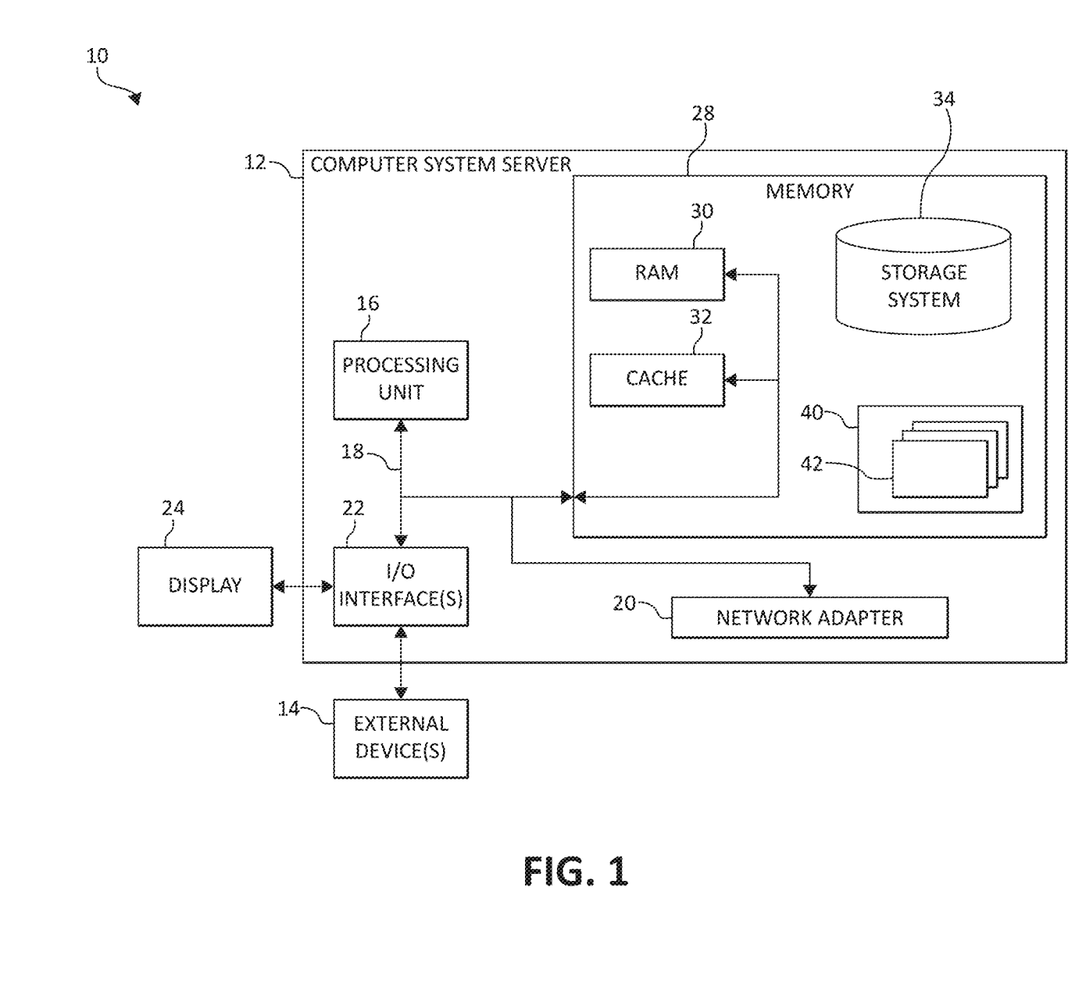
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
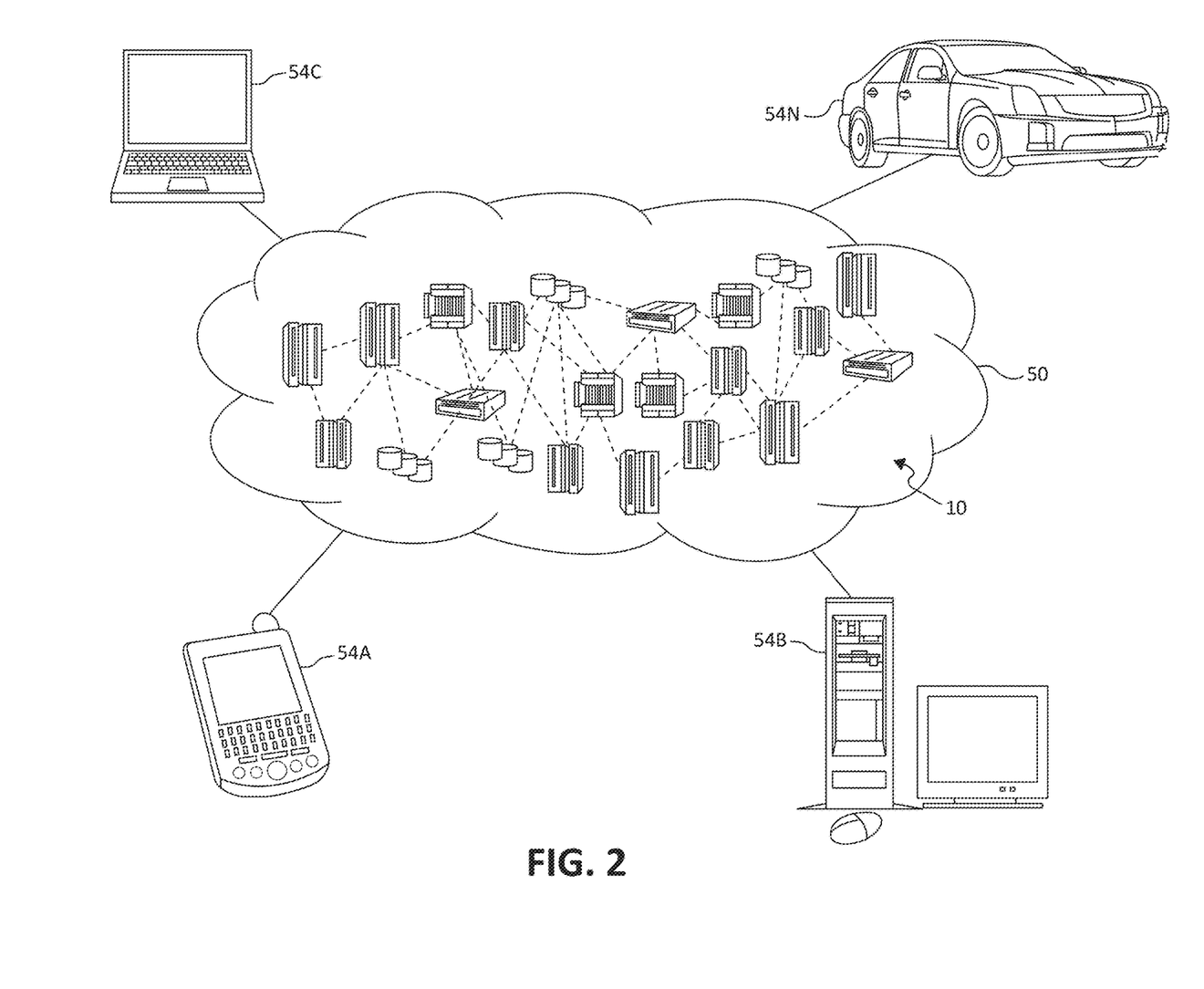
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
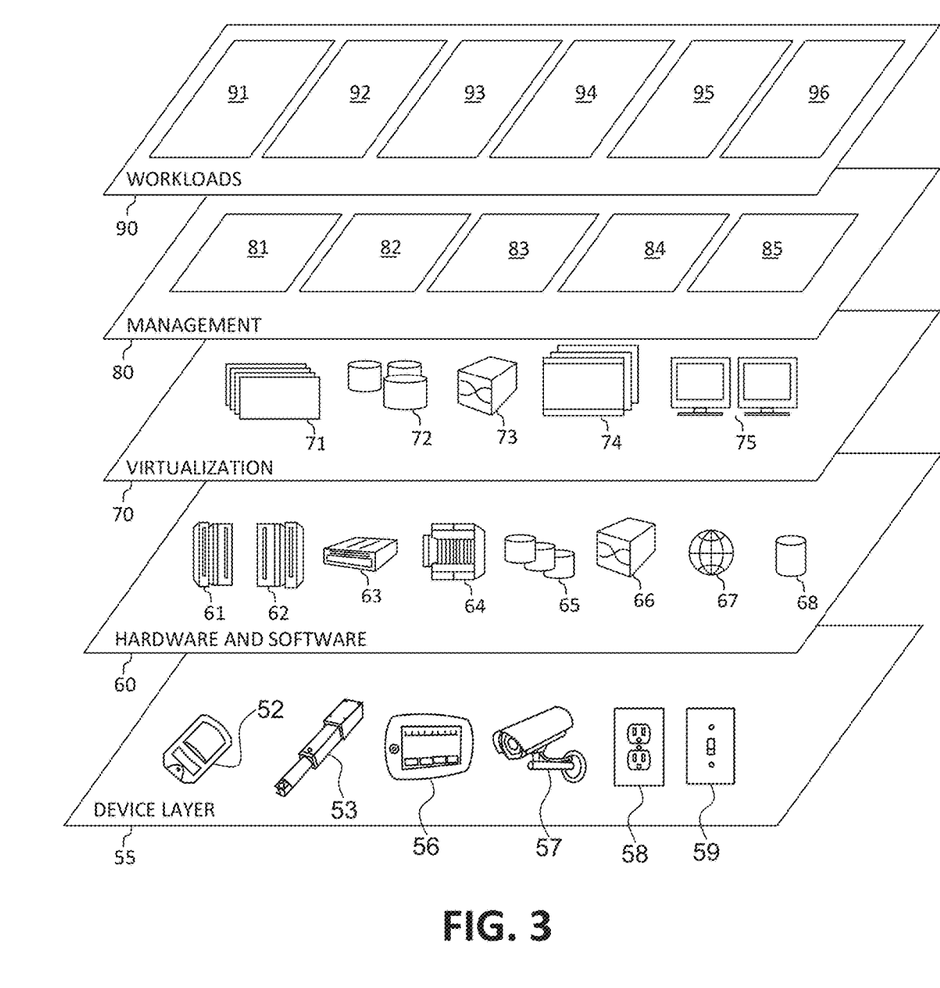
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for optimized placement of data structures in a hybrid memory. In addition, workloads and functions 96 for optimized placement of data structures in a hybrid memory may include such operations as data analytics, data analysis, and as will be further described, memory allocation functionality. One of ordinary skill in the art will appreciate that the workloads and functions 96 for optimized placement of data structures in a hybrid memory may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4A:
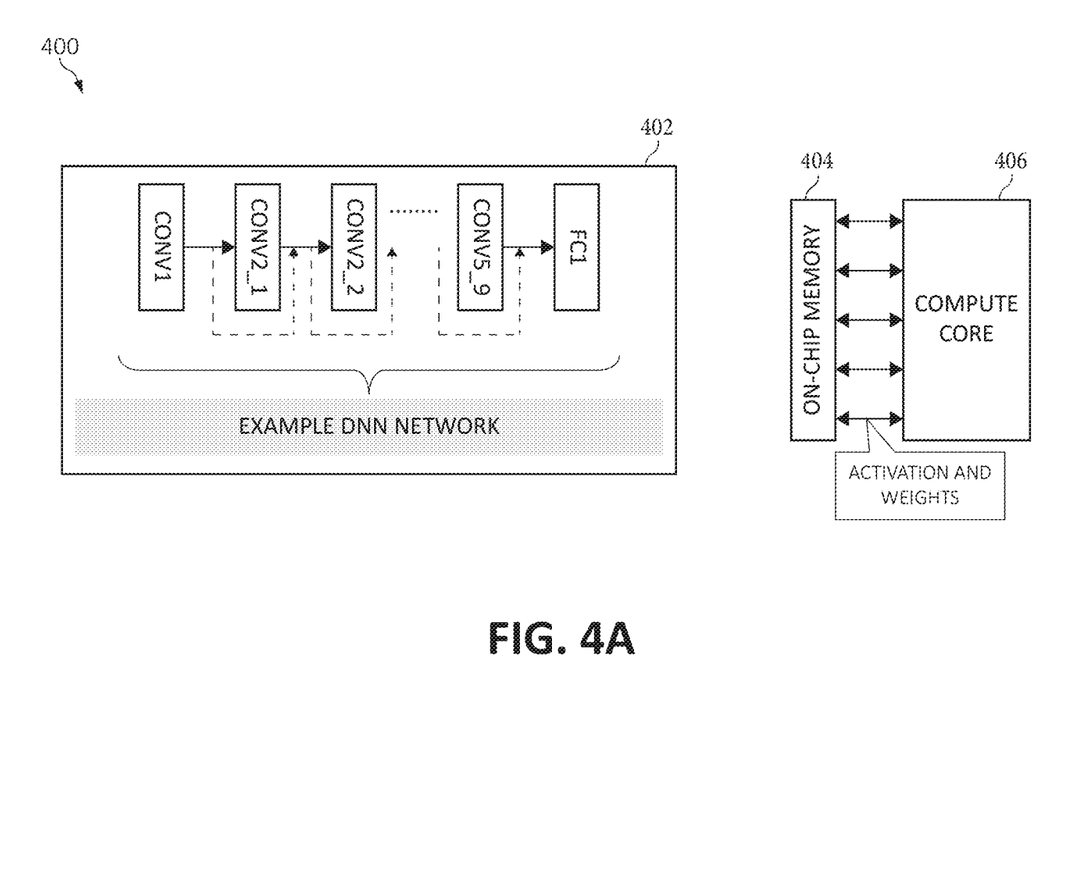
FIGS. 4A-4B are additional block diagrams depicting a deep neural network architectures in which aspects of the present invention may be realized.

Turning now to FIG. 4A, a block diagram depicts an architecture of a deep neural network ("DNN") 400 in which illustrative embodiments may be implemented. In one aspect, one or more of the components, modules, services, applications, and/or functions described in FIGS. 1-3 may be used in FIGS. 4A-4B.

For example, as depicted in FIG. 4A, the DNN 400 may be components that may be incorporated, controlled, accessed, managed, and/or included in a computer system/server 12 of FIG. 1. In one aspect, repetitive description of like elements, components, modules, services, applications, and/or functions employed in other embodiments described herein (e.g., FIGS. 1-3) is omitted for sake of brevity.

The DNN 400 may include an on-chip memory 404 (e.g., NVM-CMOS hybrid memory) to capture all different types/kinds of storage and a compute core 406. The DNN 400 may be trained using one or more operations such as, for example, backpropagation ("BP"). During the training, a large number of data structures may be generated that are associated with each layer (e.g., convolutional layers such as Conv1, Conv2_1, Conv2_2, . . . , Conv5_9, and FC1) such as, for example, weights and activations. That is, the DNN 400 may have a layered architecture where each layer (e.g., Conv1, Conv2_1, Conv2_2, . . . , Conv5_9, and FC1) may include some number of nodes, and each node effectively conducts some mathematical operation on some input to calculate an output.

As depicted, the DNN 400 may include one or more layers ("N layers") such as, for example, layers 402 (e.g., convolutional layers such as Conv1, Conv2_1, Conv2_2, . . . , Conv5_9, and fully connected "FC1"), where some are convolutional layers and other layers may be fully connected).

In one aspect, the layers 402 depicts an example DNN layer with multiple layers such as, for example, Conv1, Conv2_1, Conv2_2, . . . Conv5_9, and fully connected "FC1").

An on-chip memory 404 and a compute core 406 depict a typical DNN accelerator with an engine that executes the layers 402. In one aspect, the on-chip memory 404 and a compute core 406 may include, by way of example only, a CMOS-based and/or NVM-based memory/hybrid memory to capture all different types/kinds of storage, that brings in the weights associated with the different layers of the layers 402 (e.g., i.e. Conv1, Conv2_1, etc.) and input images for the first layer. The engine of the on-chip memory 404 and a compute core 406 then operates each layer of the layers 402 sequentially using the compute core 406, producing outputs (referred to as activations) that are stored in memory for a given layer. To execute a subsequent or following layer, the engine then uses those stored activations along with the weights for its layer and the execution continues.

Additionally, during the process of using BP for training the DNN 400, one or more compute passes may occur per layer such as, for example, Conv1, Conv2_1, Conv2_2, . . . Conv5_9, and FC1. The compute passes may include a forward pass (e.g., forward propagation "FP"), the BP, and a weight update pass. For example, initially, during a FP the weights of each layer such as, for example, Conv1, Conv2_1, Conv2_2, . . . Conv5_9, and FC1 are used to generate the activations (e.g., output activations). As time progresses, at each time step, the FP operations are completed at each of the layers such as, for example, Conv1, Conv2_1, Conv2_2, . . . Conv5_9, and FC1.

The input to any given node is a weighted sum of the outputs of the previous layer (plus a bias term usually equal to one or zero). As depicted (via the dashed lines), some outputs of some layers are required as inputs to other layers such as, for example, output of Conv1 is also used as input to Conv2_2 where the output of Conv2_1 is also used as input to Conv2_2. It is these weights that are learned by during training. To learn these parameters, the output of a training run is compared with the value, and the error is backpropagated through the network to update the weights.

It should be noted that current accelerators to execute DNNs can only accommodate smaller models (e.g., ResNet-50) and are limited by on-chip SRAM capacity constraints such as, for example, power and silicon area budget. Thus, the present invention targets larger models for inference such as, for example, a ResNet-101 (with approximately 39.8 million "M" weights). The data structures during inference provided activation and weights and the minibatch size may be equal to 1 (e.g., latency constrained inference). Also, the activation and weight precision may be 8-bits.

It should be noted, by way of example only, that an inference may be mean that a trained DNN model is used to infer or predict a given input (e.g., classify the input as "X" such as, an cat or a "Y" such as a dog) based on images shown to the trained DNN model, or translate a text from a first language to a second language based on the input text. The inference may be the production phase wherein a model may be used to predict real world data.

Thus, as depicted, the model size of the DNN 400 may be 40 megabytes ("MB") that produces a maximum ("max") activation storage of layers 402 such as, for example, an activation storage of 13 megabytes "MB". It should be noted that a model size may be the total capacity of the model, i.e. the weights (and biases), while the max activation storage represents what is the maximum size of activations that need to be stored in memory. Thus, by applying the mechanisms of the illustrated embodiments a higher density of on-chip memory 404 enables larger on-chip buffer capacity. However, the current state of the art stores weights and activation on an NVM-based on-chip buffer 404 (e.g., compute core 406). The non-hybrid NVMs lead to increased write energy and latency.

Figure 5:
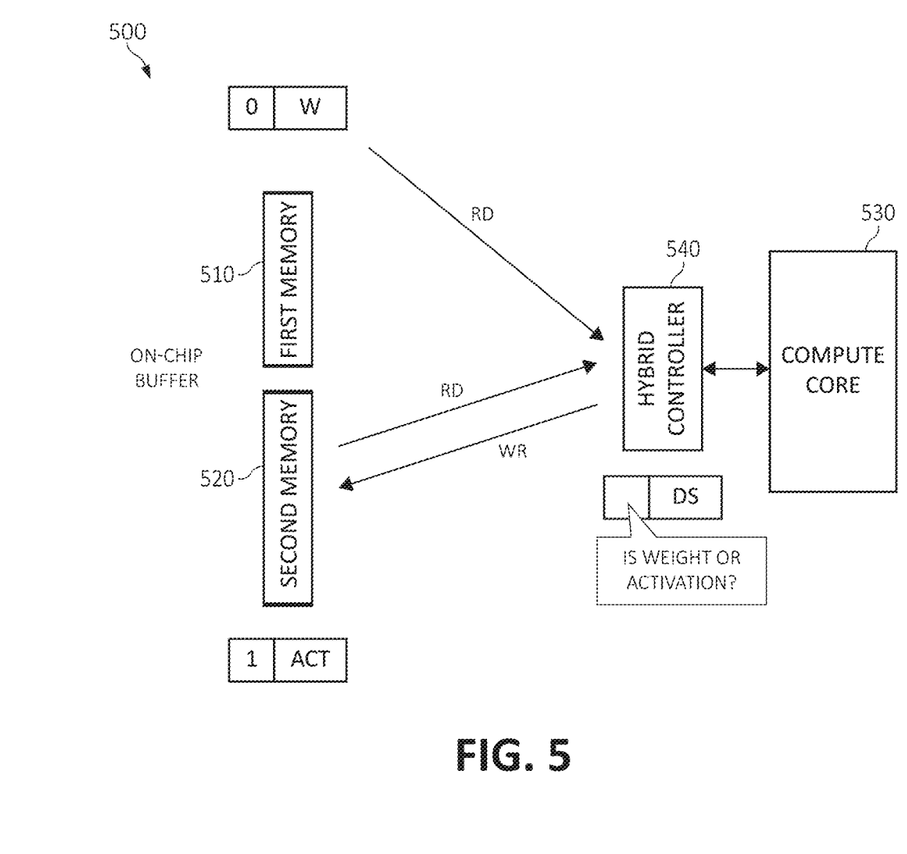
FIG. 5 is an additional block depicting optimal placement of data structures in a hybrid memory based inference engine/computing platform in which aspects of the present invention may be realized.

It should be noted that the non-hybrid memory (e.g., NVM only) is less efficient than the hybrid NVM (e.g., the NVM and SRAM as depicted in FIG. 5). For example, data mapping (e.g., data placement) of the data structures is agnostic to the characteristics of the DNN data structures. For example, the weights are static (e.g., data is written once and read several times). The activations are dynamic (e.g., data structures are read/written several times). Thus, without the deployment of the hybrid memory (see FIG. 5), a DNN employing the non-hybrid memory yields increased energy inefficiency because of high write energy of activations. For example, the NVM write energy is less efficient as compared to the hybrid memory of the illustrated embodiments (e.g., the NVM/SRAM read energy) because the NVM write energy is multiple times higher (e.g., 3-5 times higher) and the activations are written to (and read from) the NVM/CMOS buffer frequently. Additionally, the low leakage benefits of NVMs are outweighed by high write energy and performance penalty with slower write operations since the off-chip memory latency is overlapped with compute latency (e.g., the compute latency is hidden) and there is reduced opportunity for latency hiding with slower writes.

Figure 4B:
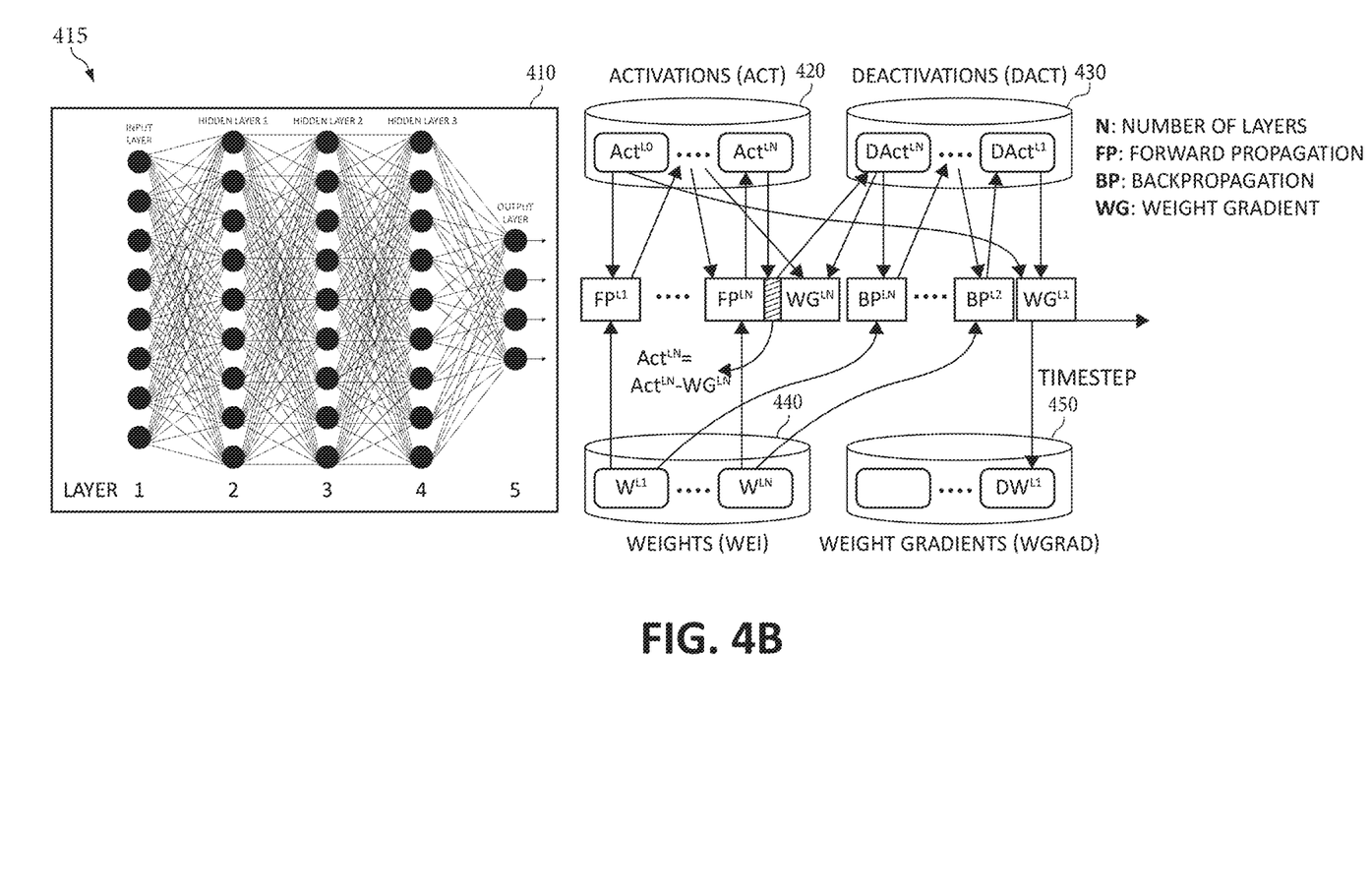

Turning now to FIG. 4B, diagram 415 depicts DNN 410 may include one or more layers ("N layers") such as, for example, layers 1-5 (e.g., where some are convolutional layers and other layers may be fully connected). The DNN 410 may be trained using one or more operations such as, for example, backpropagation ("BP"). During the training, a large number of data structures may be generated that are associated with each layer (e.g., layers 1-5) such as, for example, weights ("WEI") 440, activations ("ACT") 420, deactivations ("DACT") 430, and weight gradients (WGRAD" or "WG") 450.

The DNN 410 may include a sequence of convolutional, and fully connected layers. DNN inference uses the forward propagation (FP) which involves two data structures; weights ("WEI") and activations ("ACT"). In one aspect, two example types of data-structures may be ACT/WEI that are equal to approximately 2N data-structures for N layers, wherein "N" is a positive integer or a defined value. Also, one compute passes per layer can be a forward propagation that may be equal to approximately N compute passes for N layers.

During the process of using backpropagation ("BP") for training the DNN 410, one or more compute passes may occur per layer, for example, layer 1 ("L1), layer 2, ("L2"), layer 3, ("L3"), layer 4, ("L4"), and/or layer 5, ("L5") (or layer N, ("LN"), where "N" is a positive integer). The compute passes may include a forward pass (e.g., forward propagation "FP"), a backward pass (e.g., backpropagation "BP"), and a weight update pass (e.g., weight-gradient). By way of example only, various dependencies (shown in FIG. 4B only for illustrative purposes and not be construed as limiting in nature) occurring during each time step are depicted for the weights ("WEI") 440, the activations ("ACT") 420, the deactivations ("DACT") 430, and the weight gradients (WGRAD" or "WG") 450 while training the DNN 410 using the backpropagation ("BP").

For example, initially, during a forward pass ("FP"), the weights of each layer (WEI 440) are used to generate the activations (ACT 420). As time progresses at each time step and the FP operations are completed at each of the layers, a series of alternating steps may occur between the weight upgrade steps (e.g., WGRAD or WG 450) and the backward passes (e.g., backpropagation), which also include various dependencies between each other. For example, the weight upgrade steps (e.g., WGRAD or WG 450) may require one or more of the activations (e.g., the ACT 420) generated from the forward pass FP, which then generate the one or more of the deactivations (e.g., the DACT 430) may be generated from the BP.

Turning now to FIG. 5, a block diagram depicts an optimized DNN architecture 500 with a hybrid memory for optimized placement of data structures in the hybrid memory using a non-volatile deep neural network inference operation in which illustrative embodiments may be implemented. In one aspect, one or more of the components, modules, services, applications, and/or functions described in FIGS. 1-4 may be used in FIG. 5. For example, the optimized DNN architecture 500 may be components that may be incorporated, controlled, accessed, managed, and/or included in a computer system/server 12 of FIG. 1. In one aspect, repetitive description of like elements, components, modules, services, applications, and/or functions employed in other embodiments described herein (e.g., FIGS. 1-4) is omitted for sake of brevity.

As illustrated, the optimized DNN architecture 500 may include one or more types of memories such as, for example, an first memory 510 (e.g., NVM), and a second memory 520 such as, for example, a CMOS-based memory (e.g., SRAM), a hybrid controller 540, and a compute core 530, each of which may in association and/or communication. In one aspect, the first memory 510 (e.g., NVM) and the second memory 520 (e.g., SRAM) create a hybrid memory. In one aspect, the hybrid memory may include an on-chip NVM based buffer and also an on-chip CMOS-based buffer. In one aspect, the DNN 500 may partition the memory (e.g., the first memory 510 (e.g., NVM) and the second memory 520 (e.g., SRAM)) forming the hybrid memory for storage of model parameters and output activations.

It should be noted that the first memory 510 (e.g., NVM) and the second memory 520 (e.g., SRAM) may form a hybrid memory. The hybrid memory may be one single memory that includes both the first memory 510 and the second memory 520, which may be located on the same computing system. Alternatively, the hybrid memory may be two or more memories that includes both the first memory 510 and the second memory 520, which are discrete and separated and may be located on different or remote computing systems.

In one aspect, the "0" above the first memory 510 (e.g., NVM) and the "1" below the second memory 520 (e.g., SRAM) may be or represent the flags or indicators (representing whether they are activations ("ACT") or weights ("W")). If the value is '0' it means the value represents a weight data structure, whereas if it is '1' it would mean the value represent an activation. This indicator may assist the controller to identify weights from activations and accordingly redirect/reroute to the right destination, i.e. NVM or CMOS.

In operation each read ("RD") and each write ("WR") may be controlled by the hybrid controller 540. That is, the hybrid controller 540 may determine and distinguish between the weights and activations of the data structures ("DS"). For example, the hybrid controller 540 may, for each RD, store (reads) the model parameters to (and from) an NVM-based memory or "NVM" 510. The hybrid controller 540 may use the CMOS-based memory (e.g., second memory 520 (e.g., SRAM)) to store output activations to the CMOS-based memory (e.g., second memory 520 (e.g., SRAM)). In an additional aspect, the RD and WR represents the read and write operation and depicts the act of reading and writing to the memories (e.g., NVMs will always be just read, while SRAM could be read or written). That is, output activations ("ACT") are both read and written, while weights ("W") are just read.

In one aspect, the hybrid memory (e.g., the first memory 510 and the second memory 520) may include memory types that form one single memory such as, for example, a single, hybrid memory in a single computing system. Alternatively, the hybrid memory (e.g., the first memory 510 and the second memory 520) may include one or more memory types that are distinct and separated from each other such as, for example, in different computing systems.

In one aspect, the hybrid memory may be comprised of elements such as, for example, SRAM. The first memory 510 (e.g., NVM-based memory) include elements including, but not limited to, magnetorestive random-access memory ("MRAM"), memristor, resistive RAM ("RRAM"), conductive fridging ("CBRAM"), or phase change memory (PCM) elements. Thus, the hybrid controller 540 may provide for dynamic (programmable) allocation and partitioning of the hybrid memory (e.g., the first memory 510 (e.g., NVM) and the second memory 520 (e.g., SRAM) for model parameters and output activations. In an additional aspect, one or more compute cores such as, for example, compute core 530 may be provide for DNN with dynamic (programmable) allocation and partitioning of the hybrid memory for model parameters and output activations between one or more compute cores such as, for example, compute core 530.

Thus, the DNN 500 with hybrid memory may leverage the varying read/write characteristics of DNN data structures such as, for example by distinguishing between activations ("ACT") from weights ("W") when reading from/writing to memory. The number of writes ("WRs") to a first and a second memory (e.g., a second memory with higher write energy) may be minimized to achieve and increase energy-efficiency.

Figure 6:
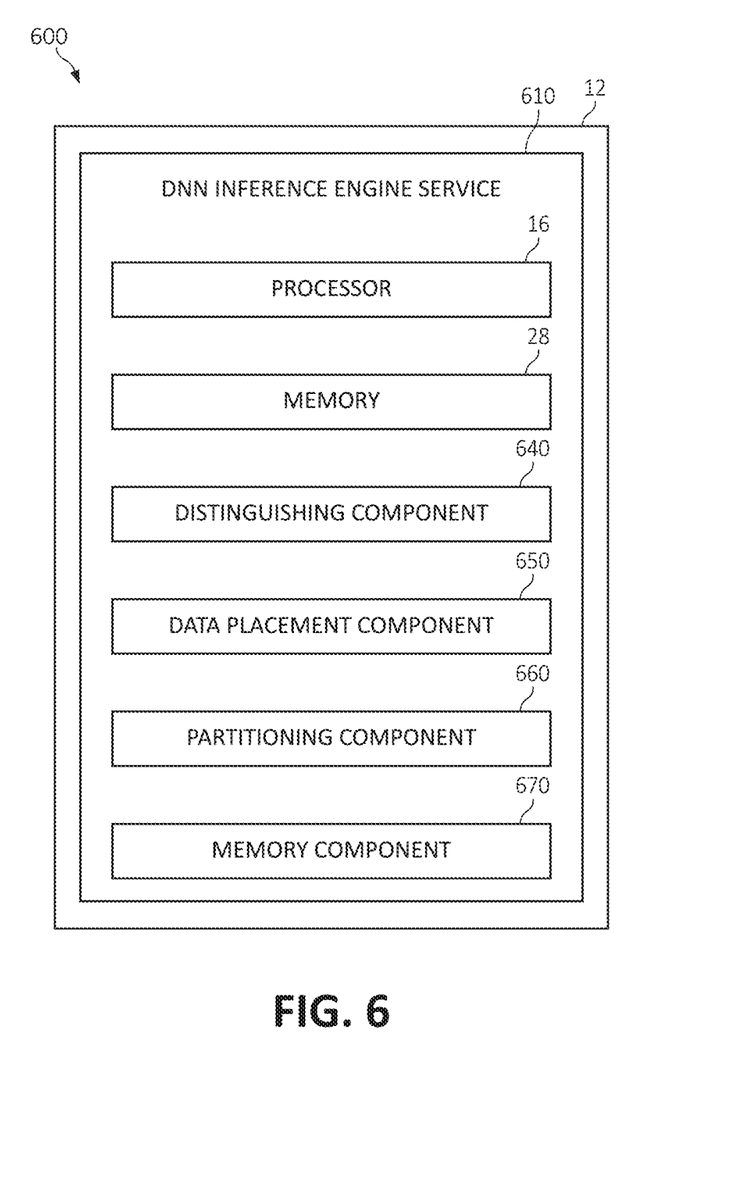
FIG. 6 is an additional block diagram depicting an exemplary functional relationship and operations between various aspects of the present invention.

Turning now to FIG. 6, a block diagram depicting exemplary functional components of system 600 according to various mechanisms of the illustrated embodiments is shown. FIG. 6 illustrates a system 600 for optimally placing data structures in a hybrid memory in a computing environment. In one aspect, one or more of the components, modules, services, applications, and/or functions described in FIGS. 1-5 may be used in FIG. 6. In one aspect, repetitive description of like elements, components, modules, services, applications, and/or functions employed in other embodiments described herein (e.g., FIGS. 1-5) is omitted for sake of brevity.

With the foregoing in mind, the module/component blocks of system 600 may also be incorporated into various hardware and software components of a system for securing data compression in accordance with the present invention.

Many of the functional blocks of system 600 may execute as background processes on various components, either in distributed computing components, or on the user device, or elsewhere.

Computer system/server 12 of FIG. 1 is shown incorporating a DNN inference engine service 610. The DNN inference engine service 610 may incorporate processing unit 16 ("processor") and memory 28 of FIG. 1 to perform various computational, data processing and other functionality in accordance with various aspects of the present invention. The DNN inference engine service 610 may be provided by the computer system/server 12 of FIG. 1.

As one of ordinary skill in the art will appreciate, the depiction of the various functional units in the DNN inference engine service 610 is for purposes of illustration, as the functional units may be located within the DNN inference engine service 610 or elsewhere within and/or between distributed computing components.

In one aspect, the computer system/server 12 and/or the DNN inference engine service 610 may provide virtualized computing services (i.e., virtualized computing, virtualized storage, virtualized networking, etc.). More specifically, the DNN inference engine service 610 may provide, and/or be included in, a virtualized computing, virtualized storage, virtualized networking and other virtualized services that are executing on a hardware substrate.

The DNN inference engine service 610 may include a distinguishing component 640, a data placement component 650, a partitioning component 660, and a memory component 670, each of which may be in communication with each other.

In one aspect, distinguishing component 640 may distinguish between the weights and the activations of the one or more data structures for placing the one or more data structures in the hybrid memory. The distinguishing component 640 may also distinguish between the weights and the activations of the one or more data structures according to characteristics of a read operation, a write operation, or a combination thereof.

The data placement component 650 may dynamically allocate one or more data structures in the memory component (e.g., a hybrid memory) according to weights and activations of one or more data structures in a deep neural network ("DNN"). In one aspect, the memory component 670 is a hybrid memory that includes both non-volatile memory ("NVM") based memory and CMOS-based memory (e.g., SRAM).

The partitioning component 660 may partition the memory component (e.g., a hybrid memory) for the weights and activations of one or more data structures. The data placement component 650 may store the weights in the NVM based memory of the hybrid memory. The data placement component 650 may store the activations in the CMOS based memory of the hybrid memory. In an additional aspect, the data placement component 650 may minimize write operations of the one or more data structures to the non-volatile memory based upon distinguishing the weights and activations.

Figure 7:
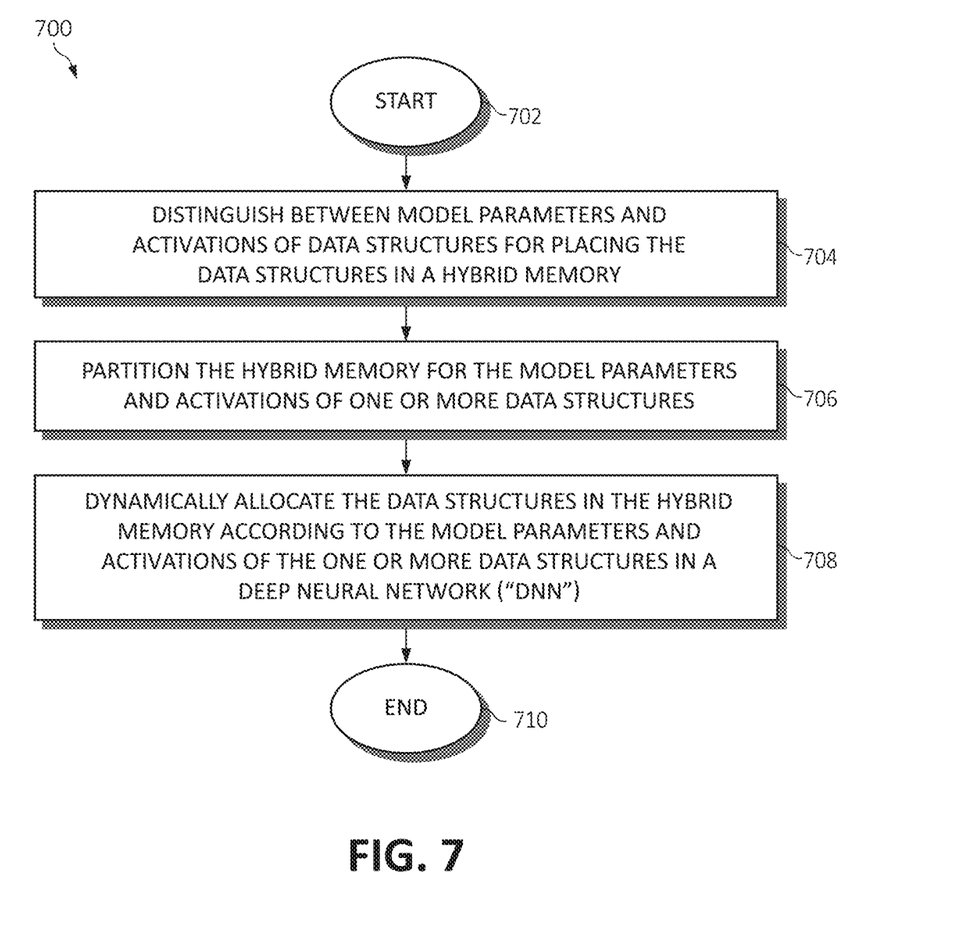
FIG. 7 is a flowchart diagram depicting an additional exemplary method for optimally placing data structures in a hybrid memory in a computing environment by a processor, again in which aspects of the present invention may be realized.

Turning now to FIG. 7, an additional method 700 for optimally placing data structures in a hybrid memory in a computing environment by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

Model parameters and activations of data structures may be distinguished for placing the data structures in a hybrid memory, as in block 704. The hybrid memory may be partitioned for the model parameters and activations of the one or more data structures, as in block 706. The data structures may be dynamically allocated in the hybrid memory according to the model parameters and activations of the one or more data structures in a deep neural network ("DNN"), as in block 708. The hybrid memory includes at least a first memory and a second memory that differ according to write attributes (e.g., write energy, a write latency, a write endurance, or a combination thereof). The functionality 700 may end, as in block 710.

In one aspect, in conjunction with and/or as part of at least one block of FIG. 7, the operations of method 700 may include each of the following. The operations of method 700 may dynamically allocate the one or more data structures in the hybrid memory according to weights and activations of one or more data structures in the DNN. The one or more write attributes may include a write energy, a write latency, a write endurance, or a combination thereof. The hybrid memory may include a non-volatile memory ("NVM") based memory and CMOS-based memory. The operations of method 700 may partition the hybrid memory for the weights and activations of one or more data structures.

The operations of method 700 may distinguish between the weights and the activations of the one or more data structures for placing the one or more data structures in the hybrid memory. The operations of method 700 distinguish between the weights and the activations of the one or more data structures according to characteristics of a read operation, a write operation, or a combination thereof.

The operations of method 700 store the weights in first memory (e.g., the NVM based memory) of the hybrid memory, and store the activations in the second memory (e.g., the CMOS based memory) of the hybrid memory. The operations of method 700 minimize write operations of the one or more data structures to the hybrid memory based upon distinguishing the weights and activations. Thus, the hybrid memory may include a first memory and a second memory that differ in attributes, properties, and/or characteristics such as, for example, write endurance, write energy and write latency. In one aspect, the first memory may be an NVM and the second memory may be a CMOS.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for optimized placement of data structures in memory in a computing environment by a processor, comprising:
   distinguishing, by a memory controller, between weights and activations of one or more data structures in a deep neural network (DNN) using flags attached to the one or more data structures, the flags having a first value indicative of the weights and a second value indicative of the activations; and
   dynamically allocating and routing the one or more data structures in a hybrid memory according to the flags indicative of the weights and activations of the one or more data structures in the DNN, wherein the hybrid memory includes at least a first memory and a second memory that differ according to one or more write attributes.

2. The method of claim 1, further including partitioning the hybrid memory for the weights and activations of the one or more data structures, wherein the one or more write attributes include write energy, write latency, write endurance, or a combination thereof.

3. The method of claim 1, wherein the distinguishing further includes distinguishing between the weights and the activations of the one or more data structures according to characteristics of a read operation, a write operation, or a combination thereof.

4. The method of claim 1, further including storing the weights in the first memory of the hybrid memory.

5. The method of claim 1, further including storing the activations in the second memory of the hybrid memory.

6. The method of claim 1, further including minimizing write operations of the one or more data structures to the hybrid memory based upon the distinguishing of the weights and activations.

7. A system for optimized placement of data structures in memory in a computing environment, comprising:
one or more computers with executable instructions that when executed cause the system to:
distinguish, by a memory controller, between weights and activations of one or more data structures in a deep neural network (DNN) using flags attached to the one or more data structures, the flags having a first value indicative of the weights and a second value indicative of the activations; and
dynamically allocate and route the one or more data structures in a hybrid memory according to the flags indicative of the weights and activations of the one or more data structures in the DNN, wherein the hybrid memory includes at least a first memory and a second memory that differ according to one or more write attributes.

8. The system of claim 7, wherein the executable instructions that when executed cause the system to partition the hybrid memory for the weights and activations of the one or more data structures, wherein the one or more write attributes include write energy, write latency, write endurance, or a combination thereof.

9. The system of claim 7, wherein the distinguishing further includes distinguishing between the weights and the activations of the one or more data structures according to characteristics of a read operation, a write operation, or a combination thereof.

10. The system of claim 7, wherein the executable instructions that when executed cause the system to store the weights in the first memory of the hybrid memory.

11. The system of claim 7, wherein the executable instructions that when executed cause the system to store the activations in the second memory of the hybrid memory.

12. The system of claim 7, wherein the executable instructions that when executed cause the system to minimize write operations of the one or more data structures to the hybrid memory based upon the distinguishing of the weights and activations.

13. A computer program product for optimized placement of data structures in memory by a processor in a computing environment, the computer program product comprising a non-transitory computer-readable storage medium having computer-readable program code portions stored therein, the computer-readable program code portions comprising:

an executable portion that distinguishes, by a memory controller, between weights and activations of one or more data structures in a deep neural network (DNN) using flags attached to the one or more data structures, the flags having a first value indicative of the weights and a second value indicative of the activations; and an executable portion that dynamically allocates and routes the one or more data structures in a hybrid memory according to the flags indicative of the weights and activations of the one or more data structures in the DNN, wherein the hybrid memory includes at least a first memory and a second memory that differ according to one or more write attributes.

14. The computer program product of claim 13, further including an executable portion that partitions the hybrid memory for the weights and activations of the one or more data structures, wherein the one or more write attributes include write energy, write latency, write endurance, or a combination thereof.

15. The computer program product of claim 13, wherein the distinguishing further includes distinguishing between the weights and the activations of the one or more data structures according to characteristics of a read operation, a write operation, or a combination thereof.

16. The computer program product of claim 13, further including an executable portion that:
stores the weights in the first memory of the hybrid memory; and
stores the activations in the second memory of the hybrid memory.

17. The computer program product of claim 13, further including an executable portion that minimizes write operations of the one or more data structures to the hybrid memory based upon the distinguishing of the weights and activations.

* * * * *